United States Patent

[11] 3,572,853

| [72] | Inventor | William D. Coski |
| | | Mercer Island, Wash. |
| [21] | Appl. No. | 806,570 |
| [22] | Filed | Mar. 12, 1969 |
| [45] | Patented | Mar. 30, 1971 |
| [73] | Assignee | Lawrence Manufacturing Company |
| | | Seattle, Wash. |

[54] ROCK BIT MOUNTING ASSEMBLY
8 Claims, 3 Drawing Figs.

[52] U.S. Cl. .................................................. 308/8.2
[51] Int. Cl. .................................................. F16c 19/14
[50] Field of Search .......................................... 308/8.2, 18, (R)

[56] References Cited
UNITED STATES PATENTS

| 1,916,233 | 7/1933 | Riblet............................ | 308/(R) |
| 1,978,085 | 10/1934 | Howard et al. ................ | 308/18 |
| 2,075,999 | 4/1937 | Reed............................ | 308/8.2 |
| 2,654,577 | 10/1953 | Green........................... | 308/8.2 |

Primary Examiner—Fred C. Mattern, Jr.
Assistant Examiner—Frank Susko
Attorneys—Carl R. Horten, David W. Tibbott and Bernard J. Murphy

ABSTRACT: A mounting assembly in which a rock bit is retained on a member, together with others thereof, by a two-piece locking plate and in which easy removal of the plate demounts the bit. The bit is rotatable on a shaft, and the shaft has a splined section which interlocks with a splined section of the hub of the bit. This splining prevents the hub from rotation on the shaft in the event the bearings freeze up.

PATENTED MAR 30 1971

3,572,853

INVENTOR
WILLIAM D. COSKI

Bernard J. Murphy
AGENT

ROCK BIT MOUNTING ASSEMBLY

This invention pertains to mounting assemblies for rock bits such as are used in mining and tunneling operations and the like and in particular to mounting assembly for a roller-type rock bit assembly of the kind carried forwardly of a mining or tunneling machine.

Rock bit mounting assemblies known in the prior art often are not readily replaceable from the mounting plate or mounting head to which they are secured. They are sometimes secured to trunnions welded to and extending from the mounting head, and this requires the removal of the entire head in order to replace only one worn rock bit.

Perhaps more often rock bits are demounted by removing threaded fasteners which secure them to the mounting head. Threaded fasteners, however, have proven unreliable because of the relative ease with which they can be undertorqued or overtorqued, and vibrate loose.

Therefore it is an object of this invention to provide a rock bit mounting assembly which supports a rock bit assembly for rotation on a further member and comprises single retainer plate means facilely installed and readily removable for mounting and demounting of the bit assembly.

Another object of this invention is to provision an improved rock bit mounting assembly which wholly avoids the problem presented by critical torquing requirements of threaded fasteners.

A feature of this invention comprises providing a two-piece retainer plate for engagement with the shaft for restraining the bearings and the bit in position on the shaft and a lock washer for securing the plate in its engagement.

Another feature of this invention comprises the provisioning of a shaft, for mounting of a rotatable, roller bit thereon, with splining, and providing complementary splining within the counting bore of the bit, to guard against damage to the bit and shaft upon the occurrence of bearing failure.

Further objects and features of this invention will become more apparent by reference to the following description taken in conjunction with the accompanying FIGS. in which.

Figure 1:
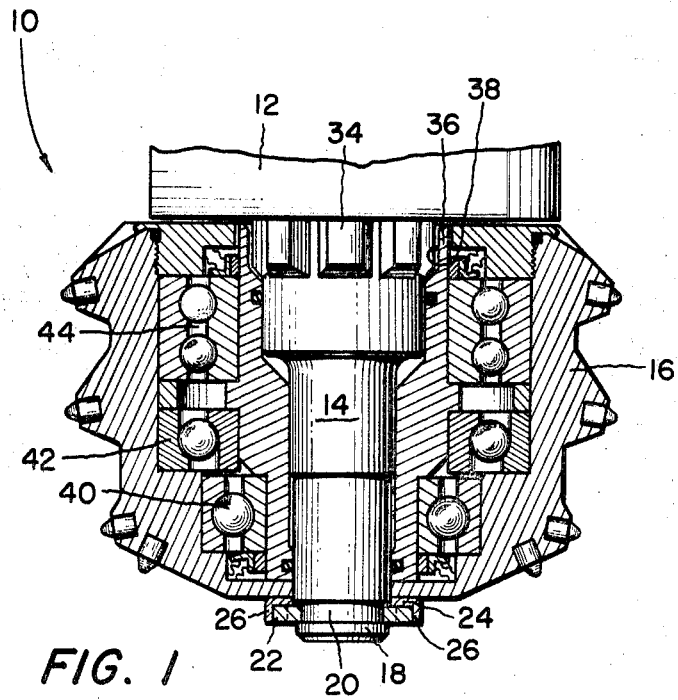
FIG. 1 is a longitudinal, cross-sectional view of a roller bit mounting assembly in an embodiment according to the invention.

As shown in FIG. 1 a rock bit mounting assembly 10 is shown carried on a cutter head 12. A shaft 14 projects from the cutter head and mounts thereupon a rock bit 16. A portion 18 of shaft 14 projects beyond the rock bit, and has a relieved area 20 formed therein. Relieved area 20 comprises an annular recess formed there to receive a lock plate 22 for retaining the rock bit 16 on shaft 14. A lockwasher 24 is disposed on the shaft 14 between lock plate 22 and rock bit 16. The lockwasher 24 has a pair of tangs 26 which, as shown in FIG. 1, are bent over to engage the outer surfaces of lock plate 22.

Figure 2:
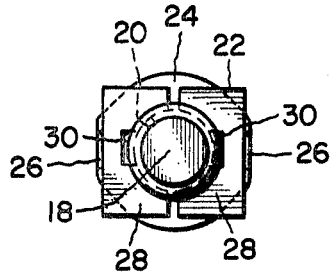
FIG. 2 is a front elevational view of the fastening arrangement of the bit mounting assembly of FIG. 1.

As shown in FIG. 2 the lock plate 22 comprises a pair of segments of identical configuration which interface each other and are disposed in relieved area 20.

Figure 3:
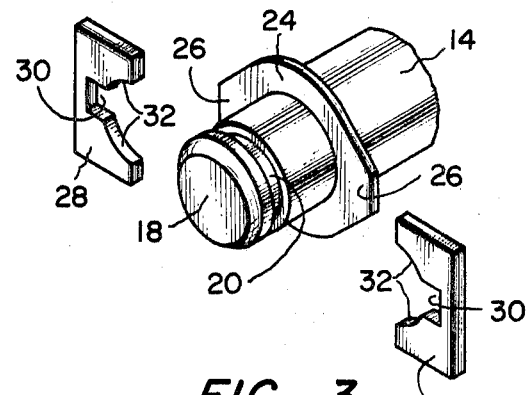
FIG. 3 is an isometric, exploded view of the lock plate, shaft, and lock washer employed in the disclosed embodiment.

In FIG. 3 it is more clearly seen that each of the segments 28 have notches 30 formed therein to facilitate the quick removal of the lock plate and consequently rock bit 16 during maintenance. On assembly, both segments 28 are disposed in relieved area 20. Arcuate engaging surfaces 32, of segments 28, are formed of a radius corresponding to that of area 20, and so they intimately nest in area 20. Then, tangs 26 of lockwasher 24 are bent over to secure lock plate 22 in position. To remove the lock plate it is quite simple, as FIG. 2 evidences, to insert a pry bar or some such similar tool in the exposed portions of notches 30. Then by using shaft portion 18 as a fulcrum, and bearing thereagainst with the tool, the segments 28 can be wrenched free.

In an additional feature of my novel rock bit mounting assembly, I provision the shaft 14 with a splined section 34, and the hub 36 of rock bit 16 with a complementary splined section 38. Sections 34 and 38 assure a firm nesting of bit 16 on shaft 14. Further, however, the splining is provided to guard against damage to the shaft 14 and bit 16. Bit 16 is rotatably mounted on shaft 14, by means of the bearings 40, 42, and 44 carried by hub 36. However, should the bearings 40—44 fail, and sieze, the hub 36 would proceed to rotate on the shaft 14. Probably irreparable damage to both the shaft 14 and hub 36 would follow from this. It is for this reason that I provide the splining. The splining insures that hub 36 will not rotate on shaft 14, whatever damage occurs to the bearings.

While I have described my invention in connection with a specific embodiment thereof, it is to be clearly understood that this is done only by way of example and not as a limitation to the scope of my invention as set forth in the objects thereof and in the accompanying claims.

I claim:

1. A mounting assembly for a rock bit, comprising:
   a cutter head;
   a shaft extending from said cutter head;
   a rock bit rotatably mounted on said shaft;
   said shaft having a relieved area formed therein, which defines an annular recess, for engaging bit retainer means;
   a lock plate in engagement with said recess;
   means restraining said lock plate in position wherein
   said lock plate comprises a plurality of segments facilitating emplacement of said plate in engagement with said recess wherein
   each of said segments have rectilinear notches formed therein in which to receive a tool for prying said segments out of said recess.

2. The invention, according to claim 1, wherein:
   said recess has a given radius;
   said lock plate has arcuate surfaces of said given radius in engagement with said recess; and
   said restraining means comprises a lockwasher having tang means extending perpendicularly therefrom in overlying engagement with said lock plate.

3. The invention, according to claim 1, wherein:
   said shaft has a portion thereof which projects beyond said rock bit; and
   said relieved area is formed in said portion.

4. The invention, according to claim 1, wherein, said lock plate comprises a pair of segments interfacingly arranged in said relieved area.

5. The invention, according to claim 1, wherein, said restraining means comprises a lockwasher disposed between said bit and said lock plate having a plurality of tangs turned therefrom and overlying outer surfaces of said segments to restrain said segments in interfacing arrangement in said relieved area.

6. The invention, according to claim 1, wherein:
   said rock bit has a hub; and
   said hub and said shaft have means cooperative for preventing rotation therebetween.

7. The invention, according to claim 6, wherein, said rotation-preventing means comprise means for preventing rotation of said hub on said shaft.

8. The invention, according to claim 6, wherein, said rotation-preventing means comprise splining formed on and about said shaft and within said hub.